J. JECZALIK.
SHADE HOLDER COUPLING.
APPLICATION FILED SEPT. 25, 1912.
1,092,795.
Patented Apr. 7, 1914.
2 SHEETS—SHEET 1.
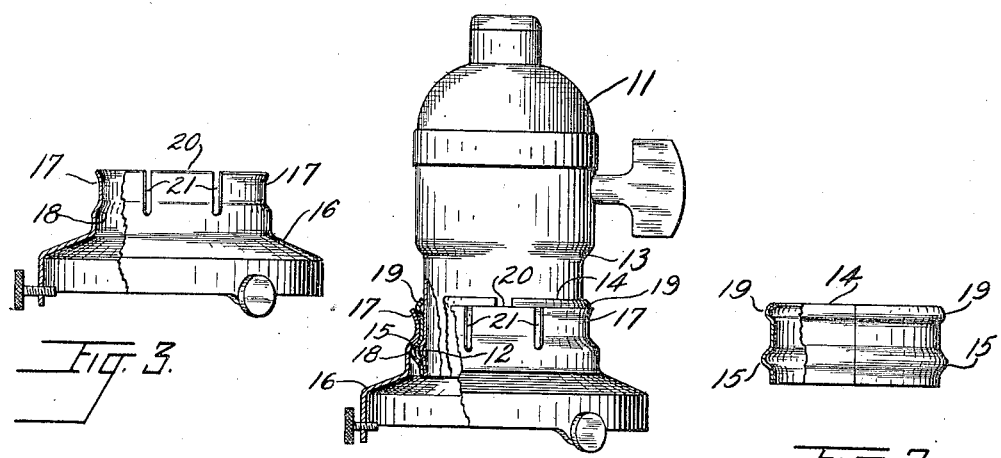
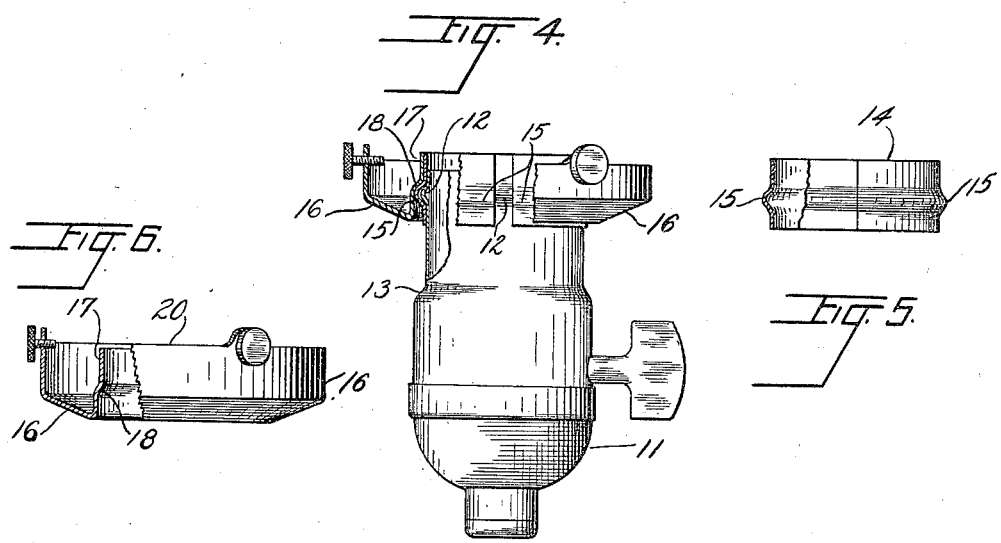
WITNESSES:
INVENTOR
John Jeczalik
BY Carl Grover
ATTORNEY J. JECZALIK.
SHADE HOLDER COUPLING.
APPLICATION FILED SEPT. 25, 1912.
1,092,795.
Patented Apr. 7, 1914.
2 SHEETS—SHEET 2.
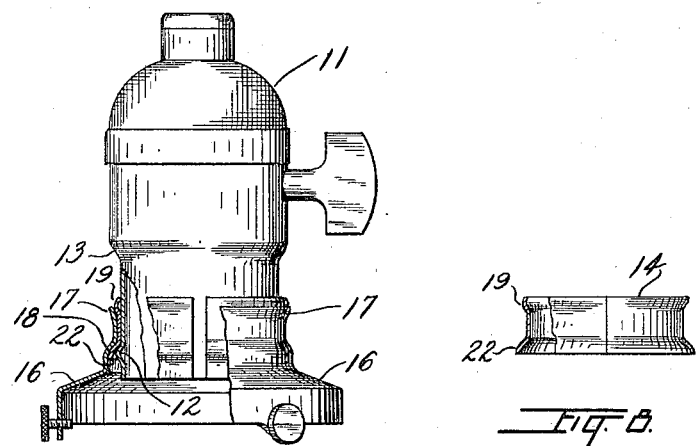
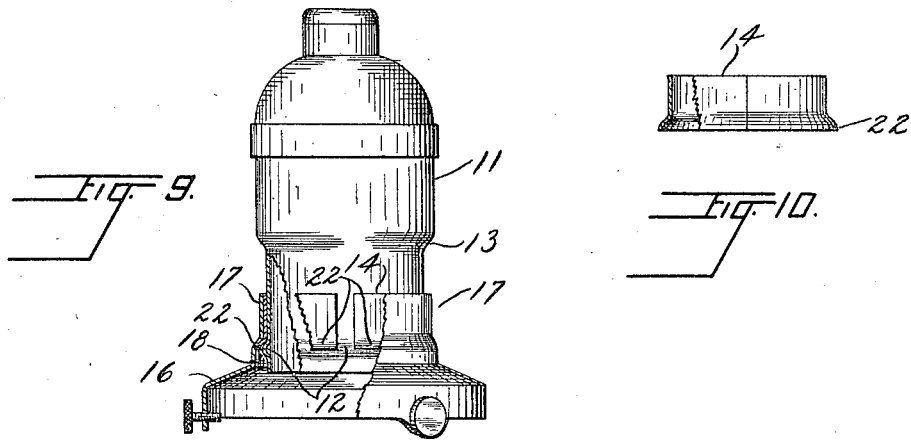

UNITED STATES PATENT OFFICE.

JOHN JECZALIK, OF CHICAGO, ILLINOIS, ASSIGNOR TO WILLIAM HEGENSCHEIDT, OF WORTH, ILLINOIS.

SHADE-HOLDER COUPLING.

1,092,795. Specification of Letters Patent. Patented Apr. 7, 1914.

Application filed September 25, 1912. Serial No. 722,226.

*To all whom it may concern:*

Be it known that I, JOHN JECZALIK, a subject of the Emperor of Austria-Hungary, residing in the city of Chicago, in the county of Cook, State of Illinois, have invented a new and useful Improvement in Shade-Holder Couplings, of which the following is a specification.

The object of this invention is to provide a simple and durable shade holder coupling, to be used chiefly in connection with electric lamp sockets, which affords a more convenient, speedy and certain method of operation, and a firmer grip upon the socket, than shade holder couplings heretofore used.

In the drawings Figure 1. is a side view of a dependent lamp socket with my shade holder coupling applied thereto in its preferred form, some of the members being partly broken away; Fig. 2. is a similar view of the collar, and Fig. 3. a similar view of the shadeholding bracket, constituting parts of my device in its preferred form; Figs. 4, 5 and 6 are views analogous to those shown in Figs. 1, 2 and 3, illustrating the application of my device, in a modified form, to a socket opening upward; and Figs. 7 and 8, and Figs. 9 and 10, respectively, show further modified forms of my device.

Referring to Figs. 1, 2 and 3, electric lampsocket 11, of ordinary construction, is provided with annular bead 12 and with shoulder 13. Split collar 14 is made of such dimensions as to tightly fit over the lower end of socket 11, and is provided with an annular bead 15 which is adapted to fit over bead 12. Shadeholder 16 is provided with an upwardly extending circular flange 17 the lower portion of which is just wide enough to form a convenient seat 18 for bead 15 when bead 15 is compressed tightly over bead 12, while its upper portion is just wide enough, in internal diameter, to enable it to be passed over bead 12. Collar 14 is formed, some distance above bead 15, with an additional bead 19, of much less prominence however than bead 15; while flange 17 is made of such length that its upper edge 20, which preferably is made slightly flaring, extends approximately to the middle of bead 19 when seat 18 is adjusted over bead 15, and is provided with slots 21 which extend from edge 20 approximately to the upper rim of seat 18.

In the modified form of my device, shown in Figs. 4, 5 and 6 bead 19 is omitted, and the upper end of flange 17 is formed straight, and, as shown, without slots 21; though such slots may be used, to some advantage, in this form also. In the modified forms shown in Figs. 7 and 8, and Figs. 9 and 10, a further modification is shown by the substitution, in place of bead 15, of a mere depending flange 22, adapted to fit over bead 12.

The operation of my device in its preferred form, shown in Figs. 1, 2 and 3, is as follows:—Shade holder 16 is pushed over socket 11 until edge 20 touches shoulder 13. Collar 14 is then slipped over the lower end of socket 11 and sprung into position with bead 15 fitted over bead 12. By means of a pull on holder 16 flange 17 is thereupon pulled down over collar 14 as far as it will go, thereby forcing bead 15 firmly into seat 18, and effecting a firm coupling of the parts. In my preferred construction additional security against accidental uncoupling is provided by the snapping together of the upper part of flange 17 below bead 19. Uncoupling is readily accomplished by pushing holder 16 upward, toward shoulder 13, thereby disengaging it from collar 14, removing collar 14, and then withdrawing socket 11 from holder 16.

The method of operation of my device in its modified forms is analogous to that used with the preferred form, and need not be further described.

I am aware that beaded collars in combination with shadeholders having openings fitting such beaded collars have been employed for the purpose of coupling shadeholders to lampsockets; but nobody, as far as I am aware, has ever employed for such purpose the simple combination of a mere circular collar with a mere flange or bead, adapted to fit the socket tightly, and a shadeholder with a mere circular opening, preferably flanged, adapted to fit tightly the collar when compressed around the socket above the bead.

I claim:—

1. In shade-holder couplings, a split circular collar adapted to fit tightly an electric lamp socket having a bead, and to be seated on such bead by means of a bead in its body, in combination with a shadeholder having a circular opening of such size that it will pass over the bead on the socket, and will fit tightly the collar when compressed around the socket above the bead, substantially as and for the purpose described.

2. In shade-holder couplings, a split collar adapted to fit an electric lamp socket having a bead, and to be seated on such bead by means of a flaring flange at its lower end; in combination with a shade holder adapted to be seated on the flange of said collar, and having a flange adapted to compress said collar around such socket.

3. In shade-holder couplings, a split collar adapted to fit an electric lamp socket having a bead, and to be seated on such bead by means of a flaring flange at its lower end, and having a bead some distance above the flaring flange; in combination with a shade holder adapted to be seated on the flange of said collar, and having a slotted flange adapted to encircle the collar and to compress it around such socket.

4. In shade-holder couplings, a split collar adapted to fit an electric lamp socket having a bead, and to be seated on such bead by means of a bead at its lower end, and having another bead some distance above the one at its lower end; in combination with a shade holder adapted to be seated on the bead at the lower end of the collar, and having a slotted flange adapted to encircle the collar and to compress it against such socket.

JOHN JECZALIK.

Witnesses:
CARL PTROVER,
HENRY M. MATTHEWS.

---

Copies of this patent may be obtained for five cents each, by addressing the "Commissioner of Patents, Washington, D. C."